United States Patent [19]

Van Ooyen

[11] Patent Number: 6,017,856
[45] Date of Patent: Jan. 25, 2000

[54] WELL SERVICING FLUIDS

[75] Inventor: Johannes Adrianus Cornelis Van Ooyen, Gressenburg, Netherlands

[73] Assignee: Verdugt B.V., Netherlands

[21] Appl. No.: 09/205,183

[22] Filed: Dec. 4, 1998

Related U.S. Application Data

[63] Continuation of application No. PCT/IP97/01069, Aug. 19, 1998.

[30] Foreign Application Priority Data

Aug. 27, 1996 [GB] United Kingdom .................... 9617834

[51] Int. Cl.⁷ ....................................................... C09K 7/02
[52] U.S. Cl. ............................................. 507/276; 507/141
[58] Field of Search .................................. 507/276, 141; 166/305.1

[56] References Cited

U.S. PATENT DOCUMENTS

| | | | |
|---|---|---|---|
| 4,440,649 | 4/1984 | Loftin et al. | 507/141 |
| 4,536,297 | 8/1985 | Loftin et al. | 507/141 |
| 5,629,271 | 5/1997 | Dobson, Jr. et al. | 507/276 |
| 5,804,535 | 9/1998 | Dobson et al. | 507/276 |

FOREIGN PATENT DOCUMENTS

| | | |
|---|---|---|
| 0 572 113 | 12/1993 | European Pat. Off. . |
| 2 251 876 | 7/1992 | United Kingdom . |
| WO 96 21900 | 8/1996 | WIPO . |

*Primary Examiner*—Philip Tucker
*Attorney, Agent, or Firm*—Nixon & Vanderhye

[57] ABSTRACT

The invention relates to an aqueous well servicing fluid comprising in solution a potassium formate characterized in that said solution contains in addition potassium citrate. The potassium citrate, which can be added as a solid to a potassium formate solution, enhances the density of said fluid and minimizes any risk of caking which may be experienced if solid potassium formate is used.

5 Claims, No Drawings

WELL SERVICING FLUIDS

This is a continuation of PCT application PCT/IP97/01069, filed Aug. 19, 1998.

The present invention relates to a composition for and method of enhancing the density of well servicing fluids prepared therefrom.

It is well known that aqueous media, especially those containing oil field brines, are generally used as well servicing fluids such as drilling fluids, completion fluids, packer fluids, well treating fluids, subterranean formation testing fluids, spacer fluids and hole abandonment fluids. For all these uses, such brines desirably have relatively high density. In order to achieve this, various components have been added to such fluids. Examples of such additives include heavy brines such as zinc bromide or combinations thereof with eg hydrophilic polymeric materials such as hydroxyethyl cellulose. One of the problems with such brines currently used is that they contain zinc atoms which are not environmentally friendly. Moreover, the polymeric hydroxyethyl celluloses are poorly hydrated, solvated or dispersed in aqueous systems which contain water-soluble salts of multivalent metals. In order to overcome the problems of toxicity it has been proposed to use a non-toxic carboxylates. The most important of these is potassium carboxylates, especially potassium formate and potassium acetate. However, one of the problems with a salt such as potassium formate it is highly susceptible to caking. This is particularly unsuitable if one attempts to transport solid potassium formate to the drilling site in order to prepare the well servicing fluid on the spot either as a fresh solution of the desired density or to enhance the density of an used/depleted well servicing fluid for the purposes of recycling. Use of conventional anti-caking agents either have an adverse affect on the density of the well servicing fluid or the other components thereof, or, the environment, or, contaminate the oils recovered.

It is an object of the present invention to devise a composition which provides the desired high density aqueous brine systems which are of much lower ecotoxicity and yet overcome the problems of caking experienced when using compounds such as potassium formate alone as density enhancers.

Accordingly, the present invention is an aqueous well servicing fluid comprising in solution a potassium formate characterised in that said solution contains in addition potassium citrate.

Both potassium formate and potassium citrate are readily available commercially. A feature of the present invention is that solid potassium citrate can be added to aqueous solutions of potassium formate to enhance the density thereof during use as well servicing fluids. This is particularly important because whilst, theoretically, solid potassium formate itself could be added to such solutions to achieve an equivalent increment in density, solid potassium formate is much more difficult to handle in view of its tendency to caking. In comparison, potassium citrate is much less prone to caking and hence can be readily handled to adjust the density of well servicing fluids at the point of use of such fluids. Thus, when a potassium formate solution is mixed with potassium citrate, there is virtually no adverse effect on the density of the potassium formate solution, on the contrary, the density of the potassium formate solution is enhanced. This is very surprising because an identical potassium formate solution when mixed with the same amount of potassium acetate or sodium formate, results in a reduction of the density of the potassium formate solution.

The amount of potassium citrate that may be added to a potassium formate solution can vary over a wide range since they are miscible over such wide ranges but is suitably in the range from 5 to 30%, preferably from 10–25% by weight.

Optionally, salts such as eg cesium formate, acetate, propionate, oxalate, cesium lactate, cesium citrate and cesium tartarate can be added to the aqueous brines used in well servicing fluids. By varying the relative concentrations of the carboxylic acid salts in the fluid it is possible to achieve the desired density of the brine or the ultimate servicing fluid in which the brine is used. Formulations containing the carboxylate and hydroxycarboxylate salts as described above are most desirable for density enhancing since they are environmentally safe and are user friendly.

Thus densities ranging, from 1.6 to 2.63 $g/cm^3$, preferably from 1.8 to 2.5 $g/cm^3$ can be achieved using the compositions of the present invention.

The well servicing fluids of the present invention can be prepared by mixing aqueous solutions of the individual salts. Alternatively, a mixture of the aqueous solutions of the respective bases of the alkali metals can first be prepared to which the desired carboxylic acid is added to form the respective carboxylates. The desired concentration of the respective salts in the aqueous solution so formed can be adjusted by evaporation of the water from the mixed solution.

The present invention is further illustrated with reference to the following Example:

EXAMPLE

A 70 weight % control solution of potassium formate in water was prepared and to this solution (density 1.58) other salts (10% by weight each) were added to determine the effect of the added salts on the density of the resultant solution. All experiments were conducted at room temperature. The results of these experiments are tabulated below:

| Additive | Density of Solution |
| --- | --- |
| None (Control) | 1.58 |
| Potassium formate | 1.60 |
| Potassium acetate | 1.53 |
| Potassium citrate | 1.60 |
| Sodium formate | 1.52 |

The above results show that potassium formate and potassium citrate are compatible and enhances the density of the solution containing both. Whilst the addition of further aliquots of potassium formate also appears to give a similar density to that achieved by adding potassium citrate, it is not convenient to add potassium formate solid at the well drilling site due to its propensity for caking.

What is claimed is:

1. An aqueous well servicing fluid comprising in solution a potassium formate characterised in that said solution contains in addition potassium citrate.

2. An aqueous well servicing fluid according to claim 1 wherein the amount of potassium citrate enhances the density of said fluid.

3. An aqueous well servicing fluid according to claim 1 wherein the amount of potassium citrate added to a potassium formate solution is in the range from 5 to 30% by weight based on the total weight of potassium formate and potassium citrate in said fluid.

4. An aqueous well servicing fluid according to claim 1 wherein said fluid optionally contains in addition, one or more salts selected from cesium formate, cesium acetate, cesium propionate, cesium oxalate, cesium lactate, cesium citrate and cesium tartarate.

5. An aqueous well servicing fluid according to claim 1 wherein the relative concentrations of potassium formate and potassium citrate in the fluid is varied to achieve fluids having densities in the range from 1.6 to 2.63 g/cm$^3$.

* * * * *